United States Patent
Manioudakis

(10) Patent No.: US 11,650,115 B2
(45) Date of Patent: May 16, 2023

(54) TENSION SENSOR

(71) Applicant: Nemtek (Pty) Ltd, Northriding (ZA)

(72) Inventor: Nicolas Manioudakis, Northriding (ZA)

(73) Assignee: NEMTEK (PTY) LTD, Northriding (ZA)

( * ) Notice: Subject to any disclaimer, the term of this patent is extended or adjusted under 35 U.S.C. 154(b) by 67 days.

(21) Appl. No.: 17/425,221

(22) PCT Filed: Jan. 27, 2020

(86) PCT No.: PCT/ZA2020/050009
§ 371 (c)(1),
(2) Date: Jul. 22, 2021

(87) PCT Pub. No.: WO2020/160575
PCT Pub. Date: Aug. 6, 2020

(65) Prior Publication Data
US 2022/0120626 A1      Apr. 21, 2022

(30) Foreign Application Priority Data

Feb. 1, 2019   (ZA) .................................. 2019/00680

(51) Int. Cl.
*G01L 5/103*        (2020.01)
(52) U.S. Cl.
CPC .................................... *G01L 5/103* (2013.01)
(58) Field of Classification Search
CPC ....... G01L 5/103; H01H 17/28; H01H 35/006
See application file for complete search history.

(56) References Cited

U.S. PATENT DOCUMENTS

| 3,450,852 A | 6/1969 | Rhodes |
| 4,683,356 A * | 7/1987 | Stoler ..................... E04H 17/10 200/61.93 |
| 4,829,287 A | 5/1989 | Kerr et al. |
| 5,371,488 A * | 12/1994 | Couch .................. G08B 13/122 340/541 |
| 5,578,990 A | 11/1996 | Sanford, Jr. et al. |
| 6,578,438 B2 | 6/2003 | Steinberg et al. |

FOREIGN PATENT DOCUMENTS

| FR | 1119883 A | 6/1956 |
| GB | 2290662 A | 1/1996 |
| WO | 9428522 A1 | 12/1994 |
| WO | 2004102142 A2 | 11/2004 |

OTHER PUBLICATIONS

International Search Report and Written Opinion for Application No. PCT/ZA2020/050009 dated Jun. 9, 2020 (9 pages).

* cited by examiner

*Primary Examiner* — Freddie Kirkland, III
(74) *Attorney, Agent, or Firm* — Michael Best & Friedrich LLP

(57) ABSTRACT

A tension sensor for an electrified fence which includes two contacts and a spring arrangement which, in response to a tension level in a taut wire in the electrified fence keeps the contacts electrically connected to each other when the tension level is below a predetermined value and which breaks such electrical connectivity when the tension level exceeds the predetermined value.

5 Claims, 5 Drawing Sheets

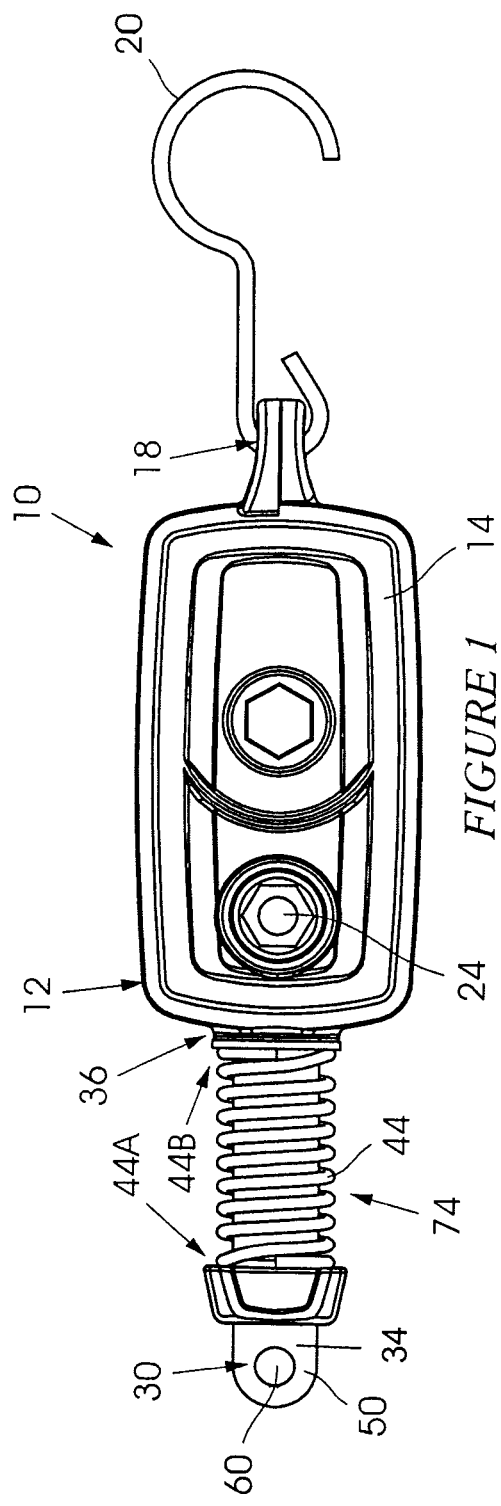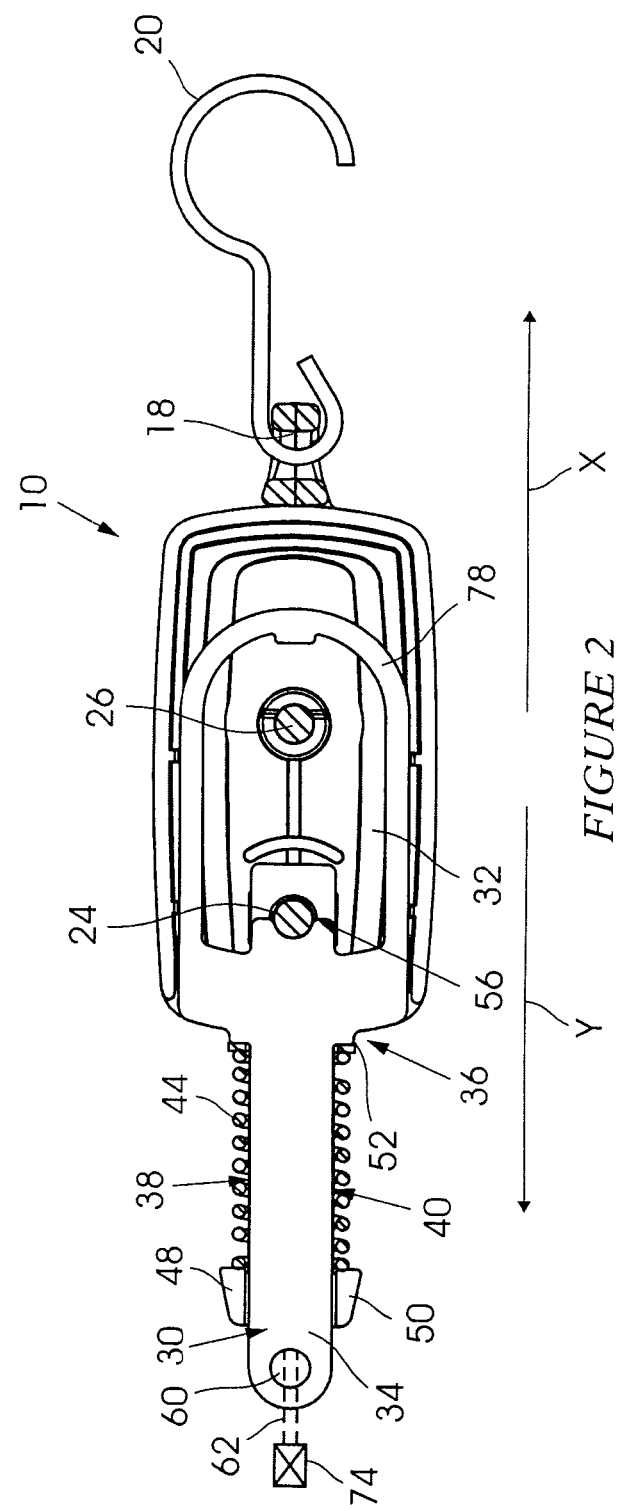

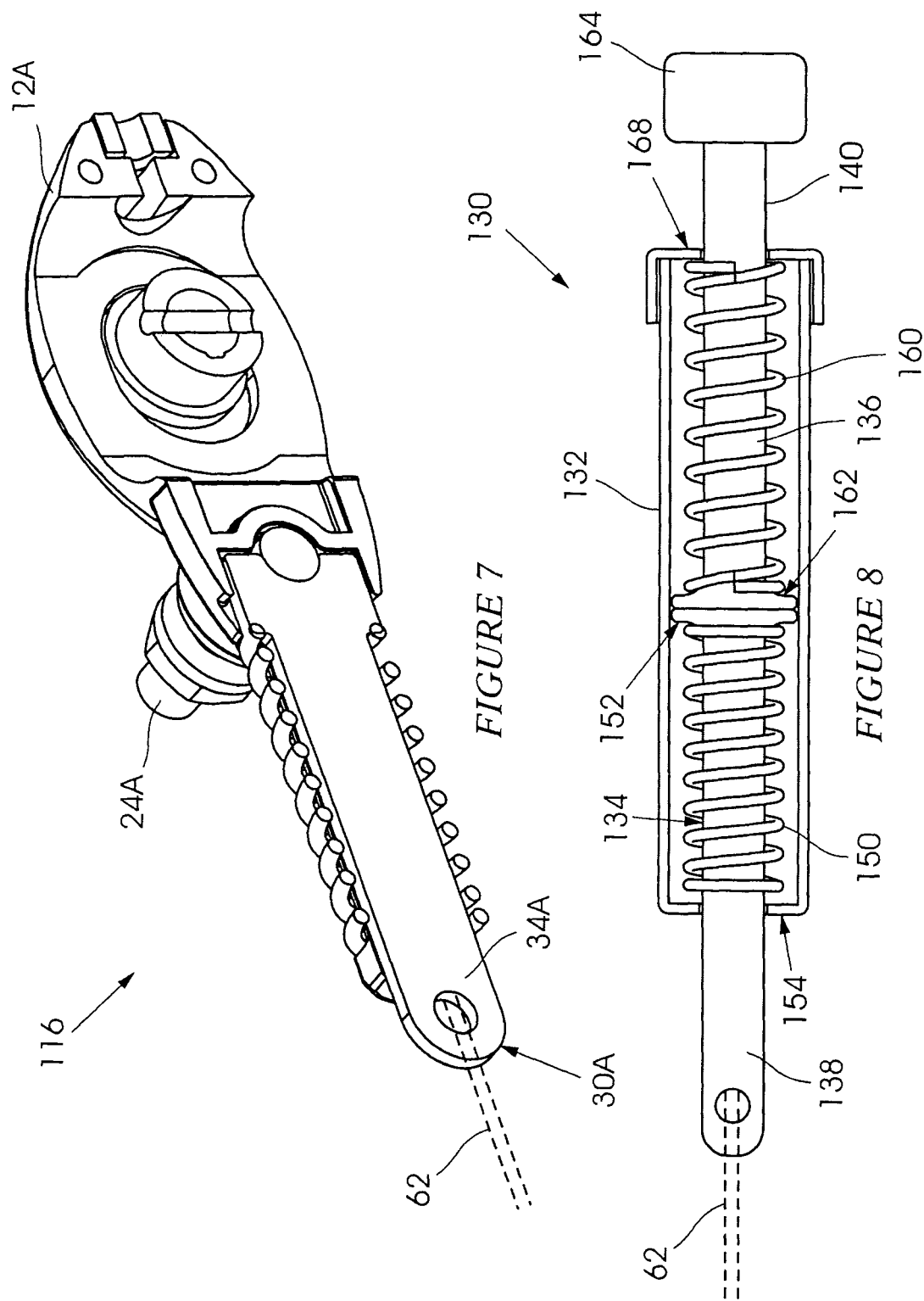

TENSION SENSOR

BACKGROUND OF THE INVENTION

This invention relates to a tension sensor which is responsive to a level of tension in a taut wire, for example in an electrified fence.

An electrified fence can be implemented in various ways. In one configuration earth and live wires, respectively arranged in series loops, are mounted in alternating fashion to supports. If a live wire touches an earth wire a short circuit occurs. Similarly, if a live wire or an earth wire is severed then an open circuit arises. In each instance detection of the event is achieved by means of an energizer which continuously imparts pulses to the wires and which is also used to monitor the wires for an open circuit, or a short circuit, condition.

An electrified fence can however be penetrated if an intruder is able to part adjacent earth and live wires sufficiently to form a gap which is large enough for the intruder to pass through. Normally this is done at ground level and a lowermost wire, which is usually a live wire, is raised so that the intruder can lie on the ground and pass below the lifted live wire. A similar situation applies if an electrified fence is erected on top of a wall.

To combat this type of attack ends of an electrically conductive device comprising a shaped length of wire are connected to adjacent live wires and an intermediate conductive loop is positioned so that an intervening earth wire passes through the loop, without touching the loop. A number of these devices are used at spaced apart intervals along the length of the electrified fence.

If an attempt is made to part adjacent wires then the loop would be moved sufficiently for the earth wire to contact the loop and a short circuit condition would arise. Although this approach is effective it can be overcome by placing an insulating material over a portion of the earth wire which is surrounded by the loop. A similar consideration applies if the loop circumscribes a live wire and ends of the device are respectively connected to adjacent, spaced apart, earth wires.

If a fence is attacked in a manner which does not result in a short circuit, or an open circuit, then inevitably there is a change in the level of tension in one or more of the wires which are normally kept taut for aesthetic and functional purposes.

Various techniques have been proposed to detect a change in the level of tension in a wire. For example U.S. Pat. No. 6,578,438 describes a taut wire sensor which makes use of silicone putty as a compensating fluid to provide a dampening force against unwanted movement in a wire.

Other disclosures of interest are in U.S. Pat. Nos. 5,578,990, 4,829,287, 3,450,852 and PCT/US2004/013916. In some cases electronic arrangements, e.g. based on the use of strain gauges or the like, monitor the tension in a wire and sound an alarm if the tension level increases or decreases beyond acceptable limits. This approach, although effective, can be expensive.

SUMMARY OF THE INVENTION

An object of the invention is to provide a tension monitoring arrangement which can detect an unwanted change in a level of tension in a wire and which, in the case of an electrified fence, can signal that change using a monitoring capacity of an energizer which applies pulses to the fence.

The invention provides a tension sensor which includes first and second contacts and a biasing structure which is responsive to a tension level in a taut wire and which maintains the contacts electrically connected to each other with said tension level below a predetermined value and which breaks electrical connectivity between the contacts if said tension level is above said predetermined value.

In one form of the invention the biasing structure includes a biasing element, e.g. a spring, which is loaded to a predetermined force and which maintains the contacts electrically connected to each other and which allows the first contact to be electrically disconnected from the second contact when the tension level in the taut wire exceeds the predetermined value.

The first contact may be connected to a live or earth wire. The second contact may be connected to a live or earth wire. Continuity between the wires connected to the first contact and the second contact may be maintained by means of the biasing structure which places the first contact in electrical connection with the second contact.

The tension sensor may include a housing to which the first contact is mounted. A member which is movable relative to the housing may include the second contact. The biasing structure may act on the member to urge the second contact into electrical engagement with the first contact.

In use of the tension sensor, the member may be connected to one end of the taut wire.

The housing may be connected to an anchor point or to an opposing end of the taut wire.

The tension sensor, in one form of the invention, may be connected in series with first and second wires and, with the tension level below said predetermined value, the tension sensor may maintain electrical continuity between the first and second wires.

The biasing structure may include a first biasing element, e.g. a first spring, and a second biasing element, e.g. a second spring, which act in series on each other.

The two biasing elements may have different biasing constants. Thus if the biasing elements are springs then the springs may have different spring constants. Consequently, the degree of deflection, compression or extension of one spring which is subjected to a predetermined force is different from the degree of deflection, compression or extension of the other spring when subjected to the same predetermined force.

The tension sensor may include a housing, a first contact attached to the housing, a conductive member mounted to the housing, a formation on the conductive member which is attachable to a wire in a fence system, a formation on the housing which is attachable to an anchor, and a first biasing element which is in a loaded condition and which acts to maintain the conductive member in electrical contact with the first contact and which allows the conductive member to move out of electrical contact with the first contact only when a tension force in the wire exceeds a predetermined value.

In a modified form of the tension sensor a second biasing element is engaged with the housing in substitution of said formation which is attachable to said anchor.

The tension sensor may include a third contact which is placed in electrical contact with the conductive member when the conductive member is displaced relative to the housing by a predetermined extent.

In another form of the invention the tension sensor includes a housing and, mounted to the housing, a first compression spring and a second compression spring which is in series with the first compression spring and which is electrically connected to the first compression spring, the second compression spring being connected to a taut wire, and wherein electrical connectivity between the first spring and the second spring is maintained while a tension level in the taut wire is below a predetermined value.

In an electrified fence a taut wire should be permitted to have a degree of movement, without sounding an alarm condition, for example to cater for the effect on the wire of a temperature change, contact with the wire by a bird, and the effect of vegetation on the wire for example in windy conditions. To this end the invention provides that it is only when the tension level in the wire exceeds a predetermined value, indicative of an attempt being made to part wires in the electrified fence, that an alarm is sounded. Thus the biasing structure referred to preferably includes a first biasing element which allows the tension in a wire to be varied up to a predetermined value and a second biasing element which is operative only when the tension in the wire exceeds said predetermined value to indicate an alarm condition. The biasing elements are preferably respective compression springs connected in an appropriate arrangement to act in series.

BRIEF DESCRIPTION OF THE DRAWINGS

The invention is further described by way of examples with reference to the accompanying drawings in which:

FIG. 1 is a plan view of a tension sensor according to one form of the invention, FIG. 2 shows the tension sensor of FIG. 1 with a cover removed, FIG. 7 shows a simplified form of the tension sensor of FIG. 1, FIG. 8 schematically depicts another tension sensor according to the invention.

DETAILED DESCRIPTION

Figure 3:
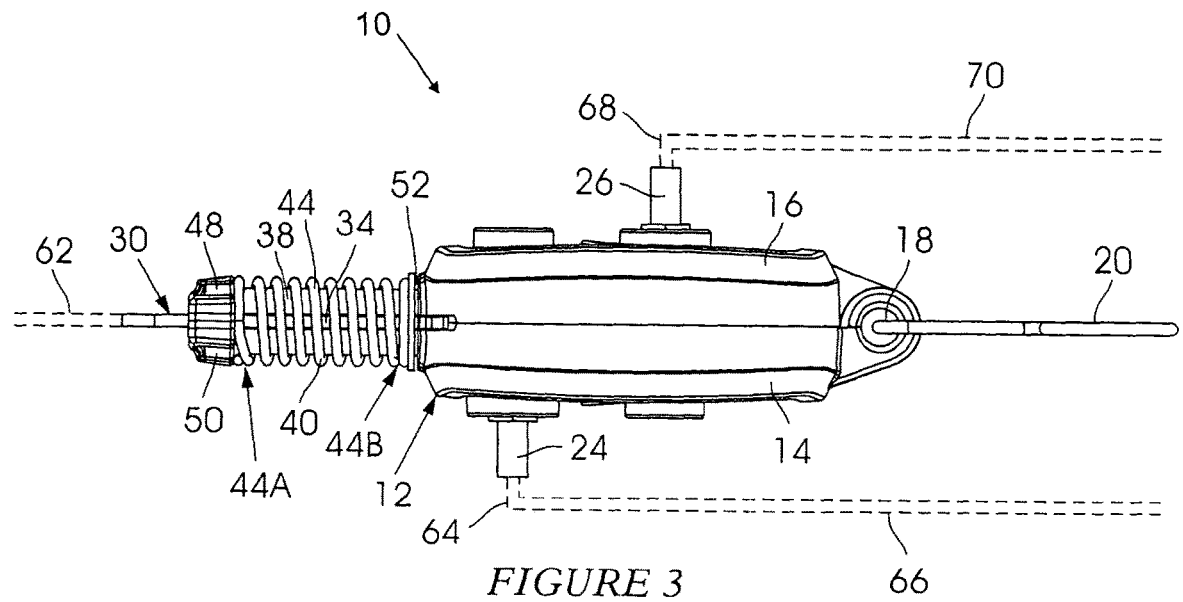
FIG. 3 is a side view of the tension sensor shown in FIG. 1.
Figure 4:
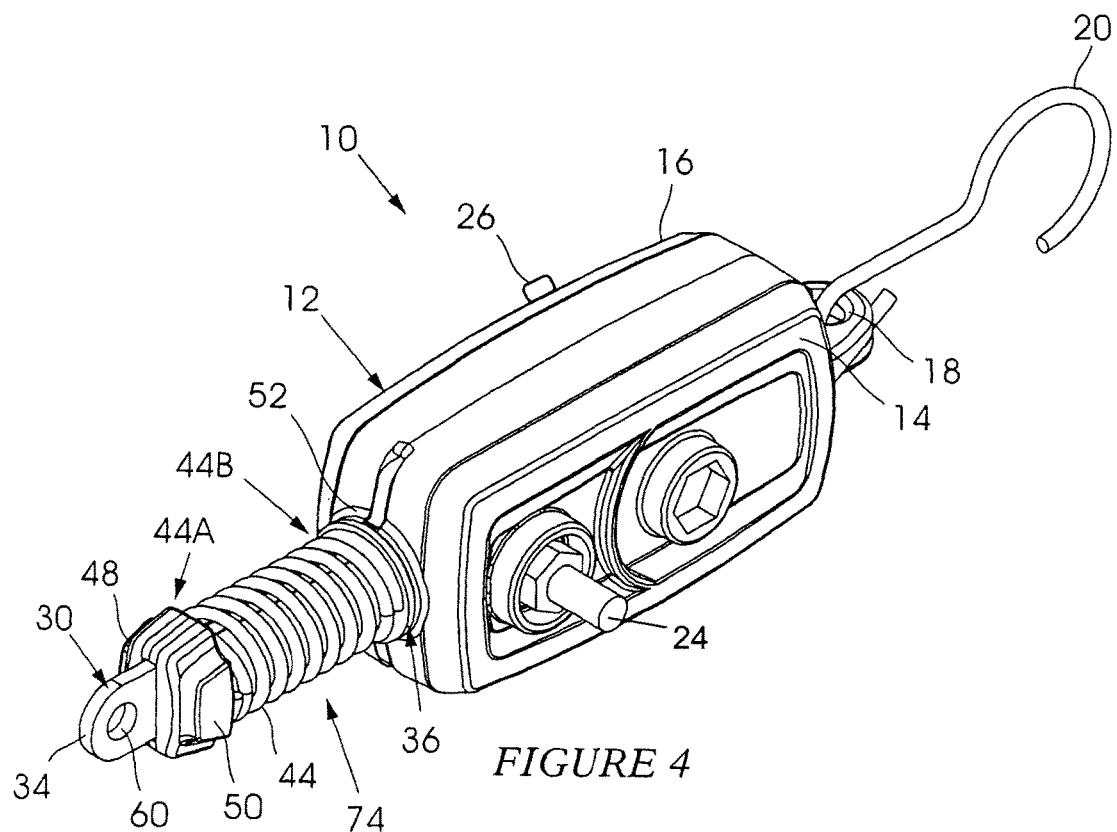
FIG. 4 is a perspective view of the tension sensor shown in FIG. 1.

FIG. 1 and FIG. 3 of the accompanying drawings illustrate in plan and from one side respectively a tension sensor 10 according to one form of the invention. FIG. 4 shows the tension sensor 10 in perspective. FIG. 2 shows the tension sensor 10 with a cover removed.

The tension sensor 10 includes a housing 12 with opposed covers 14 and 16 respectively. An eyelet 18 at one end of the housing 12 and of the covers 14 and 16 is engageable with a hook 20. A first contact 24 extends to one side of the housing 12 through the cover 14. A second contact 26 extends from the housing 12, in an opposing direction to the contact 24, through the cover 16. A conductive member 30 is partly positioned in and projects from the housing 12. The conductive member 30 has a loop 32 which is located inside the housing 12 between the covers 14 and 16, and an arm 34 which projects through an opening 36 from the housing 12. Two spaced apart limbs 38 and 40 respectively extend from the housing 12 and the arm 34 is positioned between the limbs 38 and 40. A compression coil spring 44 acts between flanges 48 and 50 at respective extremities of the limbs 38 and 40, and the conductive member 30. One end 44A of the spring 44 abuts the flanges 48 and 50 while an opposing end 44B of the spring 44 abuts a shoulder 52 at a junction of the arm 34 and the loop 32.

The function of the spring 44, which is mounted to the housing 12 in a partly compressed state, is to bias the member 30 to the right in FIG. 2 i.e. in the direction of an arrow X. In this way a recess 56, at an end of the arm 34, is kept in electrical engagement with the first contact 24.

In use of the tension sensor 10, the hook 20 is coupled to a support post, not shown, which acts as an anchor. Effectively therefore the housing 12 is kept immovable. An eyelet 60 in the arm 34 is connected to a tensioned wire, say a live wire 62, in an electrified fence system. The remainder of the fence system is not shown.

The first contact 24 is connected via a lead 64 to a second electrified wire 66 in the fence system which is of the same polarity as, and which is electrically in series with, the wire 62 (FIG. 3). The second contact 26 is connected by a lead 68 to an earth wire 70 in the electrified fence system.

The wire 62 is kept under tension by means of a conventional tensioner 74 which is notionally shown and which allows only a limited variation of the tension level in the wire 62 to take place due to extraneous effects such as, for example, the influence of temperature, inadvertent collision by a bird with the fence wire or the growth of vegetation which then impinges on the wire 62. The variation in the tension level in the wire 62 is accompanied by a corresponding degree of deformation of the tensioner 74.

If the tension in the wire 62 continues to increase then a limiting point is reached at which the tensioner 74 is not capable of further deformation. At this stage, if the tension in the wire 62 continues to increase, the force exerted by the spring 44 on the member 30 is overcome. The tensioned wire 62 pulls the arm 34 in the direction of an arrow Y against the action of the spring 44 and the recess 56 is moved out of electrical engagement with the first contact 24. This establishes an open circuit condition in the series-connected wires 62, 66 and an alarm is sounded by a standard circuit of an energizer (not shown) which is used to electrify the fence system.

If the movement of the arm 34 in the direction Y continues, i.e. if the tension force is further increased then an end 78 of the loop 32 is brought into electrical engagement with the second contact 26 which, as noted, is connected to the earth wire 70, and a short circuit condition is sounded by the standard circuit referred to, on the energizer.

Figure 5:
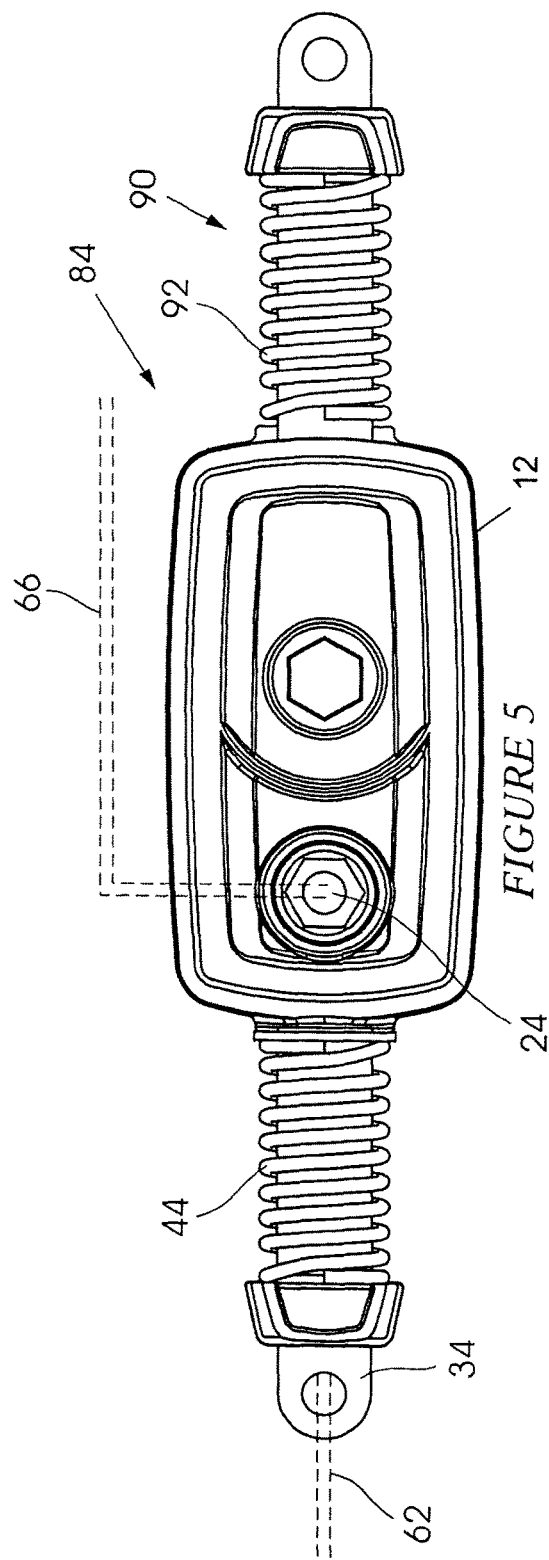
FIG. 5 is a view of a tension sensor which comprises a modification to the sensor shown in FIG. 1.

FIG. 5 shows a sensor 84 which in many respects is the same as the sensor 10. Thus only meaningful differences between the two sensors 10 and 84 are described.

The eyelet 18 and the hook 20 are replaced by a tensioning mechanism 90 which also replaces the tensioner 74 and which acts in a similar way to the tensioner 74, to establish a permitted level of tension in the wire 62 and to allow that tension level to vary within limits until a spring 92 in the tensioner 90 is fully compressed. At this point no further movement of the tensioning mechanism 90 can take place. An increase in the tension level in the wire 62 causes the spring 44 to be further compressed. The arm 34 is then moved out of electrical contact with the first contact 24, establishing an open circuit condition, in the series-connected wires 62 and 66, which is detected by the energizer circuit referred to and which then sounds an alarm.

Figure 6:
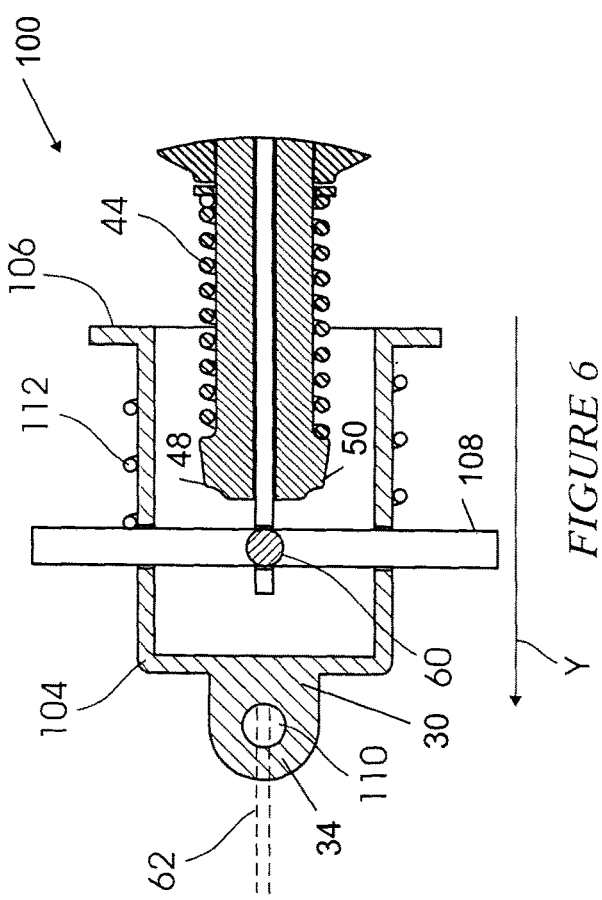
FIG. 6 shows a tension sensor according to another form of the invention.

FIG. 6 illustrates a sensor 100 which is a modified form of the sensor 10 and, consequently only differences between the sensors 100 and 10 are described. A U-shaped link 104 with a flange 106 is located over the arm 34. A cross piece 108 is fixed to the eyelet 60 in the arm 34. The spring 44 acts (as described) between the flanges 48 and 50 on the limbs 38 and 40, and the conductive member 30.

An eyelet 110 on the link 104 is connected to the wire 62 which is to be kept taut. The link 104 is electrically conductive and is kept in electrical connectivity with the arm 34 which is also electrically conductive. A spring 112 acts between the cross piece 108 and the flange 106. The function of the spring 112 is to maintain the level of tension in the wire 62 at a permitted nominal value, and to allow for a limited variation in the nominal tension level. The spring 112 acts in the same way as the conventional tensioner 74. When the spring 112 is compressed to a maximum extent any further increase in the level of tension in the wire 62 causes movement of the link 104 which, acting via the flange 106 and the cross piece 108, moves the arm 34 in the direction of an arrow Y out of electrical engagement with the contact 24. The resulting open circuit condition of the series-connected wires 62 and 66 is detected by a circuit of an energizer (not shown) which is used to apply pulses to the wires 62 and 66, and an alarm is sounded.

FIG. 7 shows in perspective a part of a sensor 116, which is similar to the sensor 10, with a cover of a housing 12A removed. A conductive member 30A comprises an arm 34A and does not include a counterpart to the loop 32 of the sensor 10. A single contact 24A extends from the housing 12A. The sensor 116 functions in the same way as the sensor 10 to detect an open circuit condition in series-connected wires 62 and 66, but does not have a facility to detect a short circuit to earth of the wires 62 and 66.

FIG. 8 schematically shows another sensor 130, according to the invention, which includes an insulating tube 132 and first and second piston-like structures 134 and 136 with respective rods 138 and 140 which extend from opposing ends of the tube 132. A first spring 150 with a first spring constant is positioned inside the tube 132 between a flange 152 which is connected to the rod 138, and an end 154 of the tube 132. A second spring 160 is located inside the tube 132 between a flange 162 which is fixed to one end of the rod 140, and an end 168 of the tube 132. The two flanges 152 and 162 are in electrical contact with each other. The second spring 160 has a second spring constant which differs from the first spring constant.

An end of the rod 140 is fixed to an anchor point 164. The rod 138 is fixed to a taut wire 62. The springs 150 and 160 which have different spring constants, are compressed to different extents and settle in positions at which the forces exerted by the springs balance. The spring 150 can take up allowable variations in the degree of tension in the wire 62. However if the tension level in the wire 62 is sufficiently high to compress the spring 150 fully then a rise in the tension level in the wire 62 causes the spring 150 to be fully compressed. Thereafter with a tension level increase, the spring 160 is compressed and the two flanges 152, 162 move apart. Electrical continuity through the sensor 130 is then broken. An alarm is then sounded by a circuit on an energizer (not shown) which applies pulses to the wire 62.

The preceding description relates to the use of the tension sensor of the invention in an electrified fence. That type of fence structure acts as a physical barrier while the wires or strands in the fence, which are electrified, provide an electric barrier. Both features work to restrict an intruder from breaching the fence. In some applications however a non-electrified fence is required for example at a swimming pool or where children are at play. A non-electrified fence acts only as a physical barrier to prevent unauthorized breach of the fence. However, it can be necessary to detect a breach of a non-electrified fence.

Figure 9:
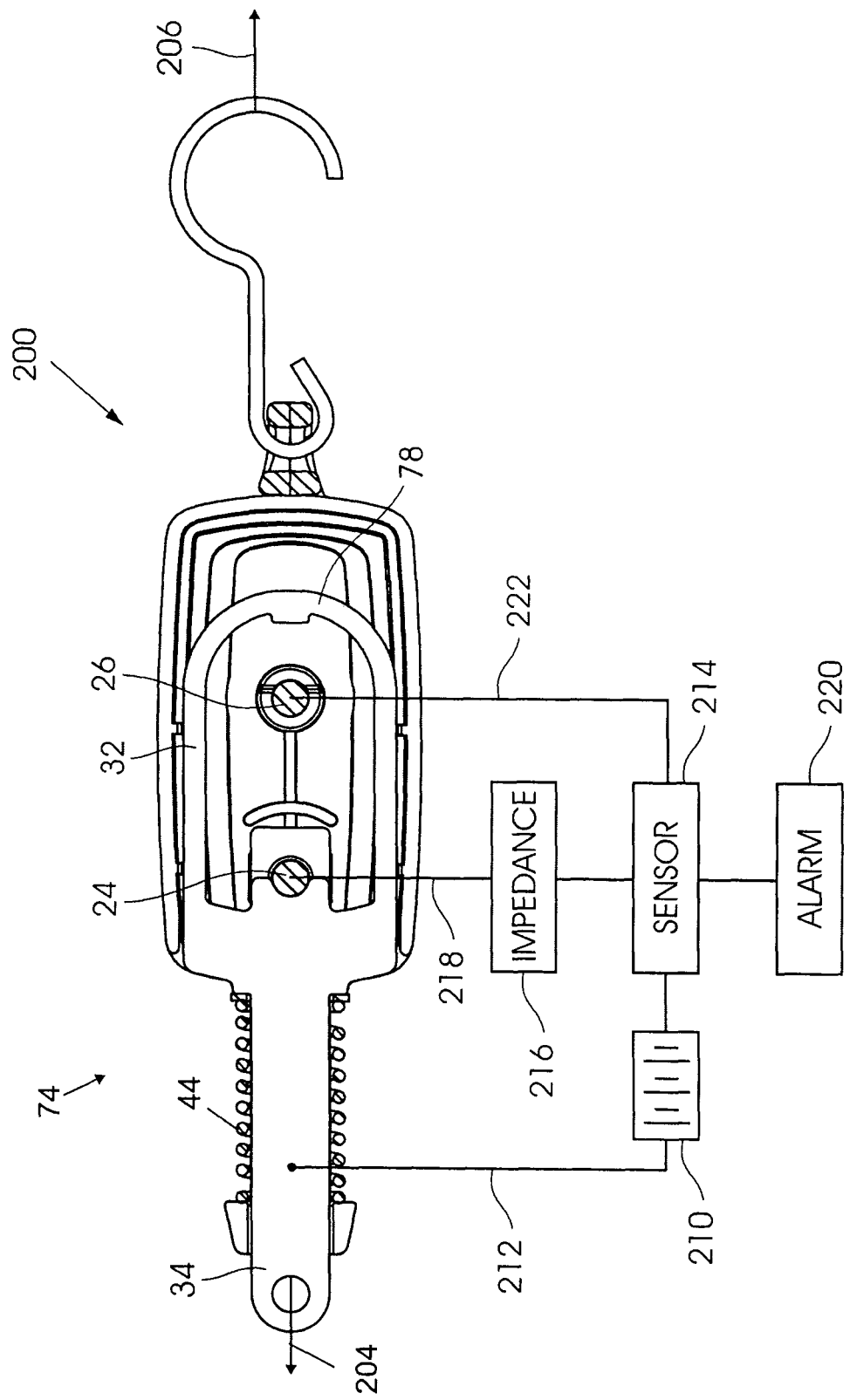
FIG. 9 shows a tension sensor according to another form of the invention.

The tension sensor of the invention can be used with a non-electrified fence as indicated, for example, in FIG. 9.

FIG. 9 is similar to FIG. 2 and shows a tension sensor 200 according to the invention. The tension sensor is connected to a non-electrified, possibly non-conductive, strand 204 and is anchored via a non-conductive strand 206 to an anchor point, not shown. The strand 204 is part of a non-electrified fence not further shown, not described, herein.

As the non-electrified fence is not provided in conjunction with an energizer an electrical source is required to enable the tension sensor to provide a monitoring function and to generate a signal if the fence is breached. A low voltage source 210 e.g. a 12 volt battery has one terminal connected by a lead 212 to the arm 34 which is conductive. The other terminal of the battery is connected via a sensor 214, a high value impedance 216 and a lead 218 to the first contact 24. If the strand 204 is tensioned, in the manner which has been described, to a non-allowable limit, the continuity of the circuit via the energy source, the impedance 216 and the sensor 214 is broken and the sensor triggers an alarm unit 220.

In a variation of the aforementioned approach, in which current continuously flows, the lead 218 is disconnected from the contact 24. A connection is made from the sensor 214 to the contact 26 via a lead 222. The contact 26 will be brought into electrical engagement with the end 78 of the loop 32 if the arm 34 is subjected to a high pulling force via the strand 204. The sensor 214 then detects current flow through the leads 212 and 222 and triggers the alarm unit 220.

The use of the tension sensor 200 allows the strands in the non-electrified fence to be tensioned to a pre-determined extent. This permits the effects of wind, birds, vegetation etc to be accommodated without triggering an alarm. However, if a strand is tensioned to such an extent that this is indicative of an attempt being made to breach the fence then an alarm signal is sounded.

The invention claimed is:

1. A tension sensor (10) for use in an electrified fence wherein the tension sensor (10) includes a housing (12), a first contact (24) which is mounted to the housing and which is configured to be electrically connected to a first wire (64) in the electrified fence, a member (30) which is movable relative to the housing and which includes a contact (56) which is configured to be electrically connected to a second wire (62) in the electrified fence, and a biasing structure which is responsive to a tension level in the wire (62) and which maintains the contacts (24, 56) electrically connected to each other when said tension level is below a first predetermined value, the biasing structure including a first biasing element ((74)-FIG. 2; (90)-FIG. 5) which allows the tension level in the wire (62) to be varied up to a limiting point (paragraphs 23, 30, 31) while maintaining the contacts (24, 56) electrically connected to each other and which is characterised in that said limiting point is less than said first predetermined value and in that the biasing structure includes a second biasing element (44) (paragraphs 23, 30, 31) which maintains the contacts (24, 56) electrically connected to each other when said tension level is greater than said limiting point but is less than said first predetermined value and which causes electrical connectivity between the contacts (24, 56) to be broken if said tension level is above said first predetermined value.

2. A tension sensor (10) according to claim 1 which includes a second contact (26) which is mounted to the housing (12) and which is configured to be connected to a third wire (68) of the electrified fence characterised in that when said tension level is above a second predetermined value which is greater than said first predetermined value movement of the member (30) causes the second contact (26) to be connected to the contact (56).

3. A tension sensor (10) according to claim 1 wherein the member (30) is electrically conductive.

4. A tension sensor (10) according to claim 1 wherein the housing (12) includes a formation (20) which is attachable to an anchor.

5. A tension sensor (10) according to claim 1 which includes an alarm unit (220) which is triggered upon breaking of said electrical connectivity.

\* \* \* \* \*